(12) United States Patent
Dewald

(10) Patent No.: US 6,591,022 B2
(45) Date of Patent: Jul. 8, 2003

(54) ILLUMINATION SYSTEM FOR SCROLLING COLOR RECYCLING

(75) Inventor: D. Scott Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/028,023

(22) Filed: Dec. 21, 2001

(65) Prior Publication Data

US 2002/0135862 A1 Sep. 26, 2002

Related U.S. Application Data

(60) Provisional application No. 60/258,985, filed on Dec. 29, 2000.

(51) Int. Cl.$^7$ .............................. G06K 9/40; H04N 9/12; G03B 21/00
(52) U.S. Cl. .......................... 382/274; 348/742; 353/31
(58) Field of Search ................................ 359/631, 626, 359/636, 291, 889, 237; 353/31, 84, 94, 98, 34, 70, 101; 345/46, 83, 204; 348/742, 751, 744; 382/274

(56) References Cited

U.S. PATENT DOCUMENTS

| | | | | |
|---|---|---|---|---|
| 5,868,480 A | * | 2/1999 | Zeinali | 353/31 |
| 6,155,687 A | * | 12/2000 | Peterson | 353/84 |
| 6,224,216 B1 | * | 5/2001 | Parker et al. | 353/31 |
| 6,256,425 B1 | * | 7/2001 | Kunzman | 382/274 |
| 6,324,006 B1 | | 11/2001 | Morgan | |
| 6,388,661 B1 | * | 5/2002 | Richards | 345/204 |
| 6,392,717 B1 | * | 5/2002 | Kunzman | 348/744 |
| 6,406,148 B1 | * | 6/2002 | Marshall et al. | 353/31 |
| 6,419,365 B1 | * | 7/2002 | Potekev et al. | 353/98 |
| 6,474,818 B1 | * | 11/2002 | Engle | 353/84 |

OTHER PUBLICATIONS

U.S. patent application Ser. No. 09/705,467, Dewald et al., filed Nov. 3, 2000.

* cited by examiner

*Primary Examiner*—Georgia Epps
*Assistant Examiner*—Jack Dinh
(74) *Attorney, Agent, or Firm*—Charles A. Brill; Wade James Brady, III; Frederick J. Telecky, Jr.

(57) ABSTRACT

Distortion optics are used to efficiently couple a spiral color wheel and an orthogonal modulator. Light 602 from a light source enters an aperture in a reflective end of a recycling integrator rod 604. The light travels through the rod and exits the end of the rod adjacent a sequential color filter 606, shown as a spiral color wheel. The shape of the light beam 608 exiting the integrator rod 604 is determined by the shape of the exit aperture of the integrating rod 606. The exit aperture of the integrating rod 606 typically is formed by a reflective exit aperture on the exit face. A cross section of the light beam 608 exiting the sequential color filter includes several bands of filtered light, one for each of the filter segments of the color wheel illuminated by the light beam. The curvature of the color bands makes it difficult for a row addressed spatial light modulator to efficiently use the light. Illumination system 600 eliminates or mitigates this problem by distorting the light from the integrating rod to straighten the curved borders between the adjacent filter segments. The light 608 from the sequential color filter 606 is distorted by distortion optics 610, 612 to make the boundaries between the white or primary colored light segments align with the rows of the spatial light modulator 614.

50 Claims, 5 Drawing Sheets

ILLUMINATION SYSTEM FOR SCROLLING COLOR RECYCLING

CROSS-REFERENCE TO RELATED APPLICATIONS

This application claims priority under 35 USC §119(e)(1) of provisional application No. 60/258,985 filed Dec. 29, 2000.

The following patents and/or commonly assigned patent applications are hereby incorporated herein by reference:

| Patent No. | Filing Date | Issue Date | Title |
|---|---|---|---|
| 6324006 | May 17, 2000 | | Spoke Light Recapture In Sequential Color Imaging Systems |
| 09/705,467 | Nov. 3, 2000 | | Sequential Color Recapture for Projection Systems |

1. Field of the Invention

This invention relates to the field of display systems, more particularly to scrolling color recapture projection display systems.

2. Background of the Invention

Viewers evaluate display systems based on many criteria such as image size, resolution, contrast ratio, color purity, and brightness. Image brightness is a particularly important metric in many display markets since the available brightness can limit the image size of a projected image and controls how well the image can be seen in venues having high levels of ambient light.

Projection display designers increase the brightness of a given projection display by increasing the light source used to form the image. Increasing the light source, however, also increases the cost, size, and weight of the display system. Additionally, larger light sources generate additional heat that must be dissipated by the display.

Many other factors affect the brightness of the images produced by the display system. One of the major factors is the number of modulators used to modulate the light used to produce the image. Display systems that use a modulator with a very fast response time, such as the Digital Micromirror Device™, can use a single modulator to create a full color image. Other display systems use three modulators, such as liquid crystal display (LCD) panels or micromirrors, to create a full color image.

Micromirror-based display systems typically operate the micromirrors in a digital, or bistable, manner. Digital operation fully deflects a given micromirror to either a first position or a second position. The illumination optics of the display device illuminate the entire array of micromirror cells. Micromirrors deflected to the first position reflect light along a first path, whereas micromirrors deflected to a second position reflect light along a second path. The projection optics of the display system collects the light from the mirrors in the first position and focus the light onto an image plane. The light reflected by mirrors in the second position is prevented from reaching the image plane. An image pixel associated with a mirror in the first position is brightly illuminated, whereas an image pixel associated with mirrors in the second position are not illuminated.

Pulse width modulation creates the perception of gray scale intensities with a digital micromirror device or other spatial light modulator. When using pulse width modulation, a given micromirror element is rapidly turned on and off in response to a digital intensity word. The duty cycle of the mirror determines the total amount of light contributed to an image pixel. If the pixel is pulsed quickly enough, the human eye will accurately measure the average intensity of the pixel, but will fail to detect the pulsing.

Full-color images also are produced by taking advantage of the relatively slow response time of the human eye. Each frame period is divided into at least three periods. During each period, a primary color image is produced. If the primary color images are produced in rapid succession, the eye will perceive a single full-color-image.

An alternative to the sequential color display system is a three-modulator display system. The three-modulator display system is very similar to the sequential color display system in that they both form full color images by the combining three primary color images. The disadvantage of the three-modulator display system is the cost of the three modulators and the complex optics required both to split the white light beam from the light source into three primary color light beams and to recombine the modulated primary color light beams.

The disadvantage of the single-modulator sequential color display systems is its low image brightness. Because the white light source is time-divided into three primary color light beams, most of the light at any given time is not used. For example, when the blue primary color image is being formed, the green and red output of the white light source are filtered out of the light beam. Thus, a sequential color display system, while generally less expensive than the three-modulator display system, makes very inefficient use of the light produced by the light source.

The lost light not only reduces the brightness of the image produced by the display system, discarding the light creates several problems for the display system. The light filtered out of the light beam generally becomes stray light that the display system must control to prevent from reaching the image plane and degrading the contrast of the displayed image. The off-primary light is generally converted to heat. The heat must be dissipated by using larger fans, which in turn increase the noise produced by the display system and increase the size of the display system.

A recently developed projector architecture, commonly called sequential color recapture or scrolling color recycling (SCR), uses a sequential color filter with filter segments small enough that at least one of each primary color, and white if used, are simultaneously imaged on the modulator. The light rejected by the filter is reflected and presented to the filter a second time, hopefully to another filter segment. Assuming the recycling mechanism is perfectly efficient, the system has the effect of directing all of the light of each primary color to the corresponding primary color filter and is therefore potentially as bright as a three modulator system. Considering the inefficiencies involved the system is 1.5 to 1.8 times as bright as a comparable one modulator system.

The SCR illumination system is difficult to use with conventional micromirror devices. Conventional micromirror devices group many rows together in a reset group and apply the same reset bias voltage to the entire group. Since many entire rows must be reset simultaneously, it is difficult to track the shadow of the filter boundary across the face of the modulator. What is needed is a system and method to allow efficient use of an SCR illumination system with a block reset device such as a micromirror.

SUMMARY OF THE INVENTION

Objects and advantages will be obvious, and will in part appear hereinafter and will be accomplished by the present invention which provides a method and system for efficient scrolling color recycling with a line-addressed modulator. One embodiment of the claimed invention provides a display system. The display system comprising: a light source, a recycling integrator rod, a sequential color filter a spatial light modulator, distortion optics, and a controller. The light source produces producing a beam of white light along a path. The sequential color filter receives the beam of white light to form a filtered beam of light having a first cross section. The spatial light modulator has a second cross section. The distortion optics on an optical path between the sequential color filter and the spatial light modulator. The distortion optics operable to receive and distort the filtered beam of light to form a filtered beam of light having a second cross section. The controller is electrically connected to the spatial light modulator for providing image data to the spatial light modulator. The spatial light modulator being operable to modulate the filtered beam according to the image data.

Another embodiment of the claimed invention provides a display system. The display system comprising: a light source, a sequential color filter a spatial light modulator, distortion optics, and a controller. The light source produces producing a beam of white light along a path. The sequential color filter comprising a spiral color wheel. The sequential color filter receives the beam of white light to form a filtered beam of light having a first cross section. The first cross section having at least one curved side following a boundary between two segments on the spiral color wheel. The spatial light modulator has a second cross section. The distortion optics on an optical path between the sequential color filter and the spatial light modulator. The distortion optics operable to receive and distort the filtered beam of light to form a filtered beam of light having a second cross section. The controller is electrically connected to the spatial light modulator for providing image data to the spatial light modulator. The spatial light modulator being operable to modulate the filtered beam according to the image data.

Another embodiment of the present invention provides a method of illuminating a spatial light modulator. The method comprising: producing a beam of white light along a path; sequentially color filtering the beam of white light to form a filtered beam of light having a first cross section; distorting the filtered beam of light to have a second cross section; and spatially modulating the distorted beam of light using a spatial light modulator, the distorting operable to improve the alignment of filter boundaries to groups of spatial light modular elements.

Another embodiment of the present invention provides a method of illuminating a spatial light modulator. The method comprising: producing a beam of white light along a path; sequentially color filtering the beam of white light using a spiral color wheel to form a filtered beam of light having a first cross section, the first cross section having at least one curved side following a boundary between two segments on the spiral color wheel; recycling light rejected by the color filtering using a recycling integrator on the path of the white light beam, the recycling integrator having an exit aperture defining the first cross section; distorting the filtered beam of light to have a second cross section; and spatially modulating the distorted beam of light using a spatial light modulator, the distorting operable to improve the alignment of filter boundaries to groups of spatial light modular elements.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new optical system and method has been developed that enables the efficient use of scrolling color recycling illumination with line addressed modulators. The new system and method distort the image of the color wheel that is projected onto the face of the spatial light modulator to optically straighten the boundaries between the curved color filter segments. This enables efficient use of row addressed modulators since an entire row is illuminated by a single color and the illumination color for all the elements in a row changes at the same time.

Figure 1:
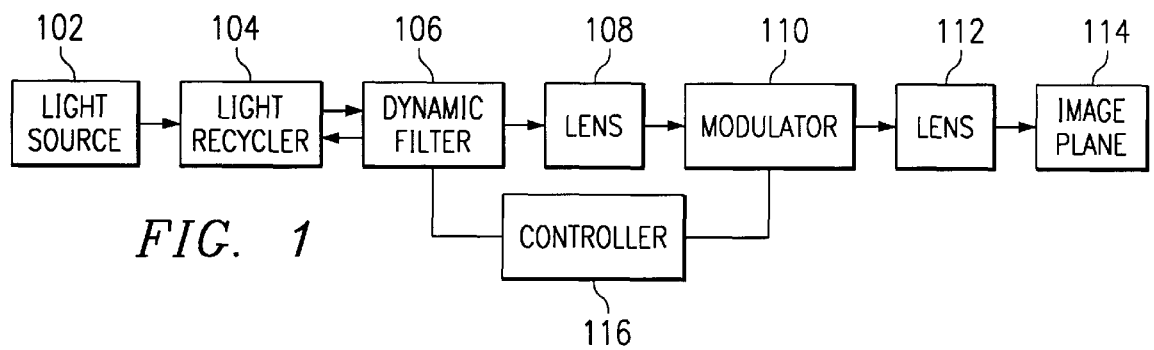
FIG. 1 is a block diagram of a sequential color recycling system according to one embodiment of the present invention.

FIG. 1 is a block diagram of a sequential color recycling system according to one embodiment of the present invention. In FIG. 1, light source 102 provides a beam of light to a light recycler 104. The light recycler 104, which sometimes includes the lamp housing or reflector, homogenizes the beam of light and passes it to a dynamic filter 106. The dynamic filter is typically a set of moving dichroic filters, such as a color wheel. Each filter in the dynamic filter has a pass band in which light of a range of wavelengths is selected, in this case transmitted, while out of band light is rejected, in this case reflected.

Light transmitted by the dynamic filter 106 is focused by lens 108 onto a spatial light modulator 110. The spatial light modulator 110 modulates the light to form an image bearing beam of light that is focused by lens 112 onto an image plane 114. Controller 116 receives image data and sends primary color image data to the modulator 110 in synchronization with the dynamic filter 106.

As described above, the dynamic filter transmits light in its pass band and rejects light outside its pass band. FIG. 1 shows the rejection path leading back to the light recycler 104. The light recycler 104 receives the rejected light and reflects it back to the dynamic filter 106. If the recycled light strikes a filter having a different pass band it may be transmitted to lens 108. Rejected portions of the recycled light are again recycled by the light recycler 104 and presented to the dynamic filter 106. This process continues until the light either is absorbed by the light recycler 104, accepted by the dynamic filter 106, or escapes the light recycler 104.

One element of the system shown in FIG. 1 is the dynamic filter 106. The dynamic filter must provide one or more segments of each primary color filter to the light beam at all times in order for all of the recycled light to be able to find a filter through which it may pass. Although the filters for each color need not be the same size, if the recycling operation is efficient there is no advantage to unequal sized filters.

Figure 2:
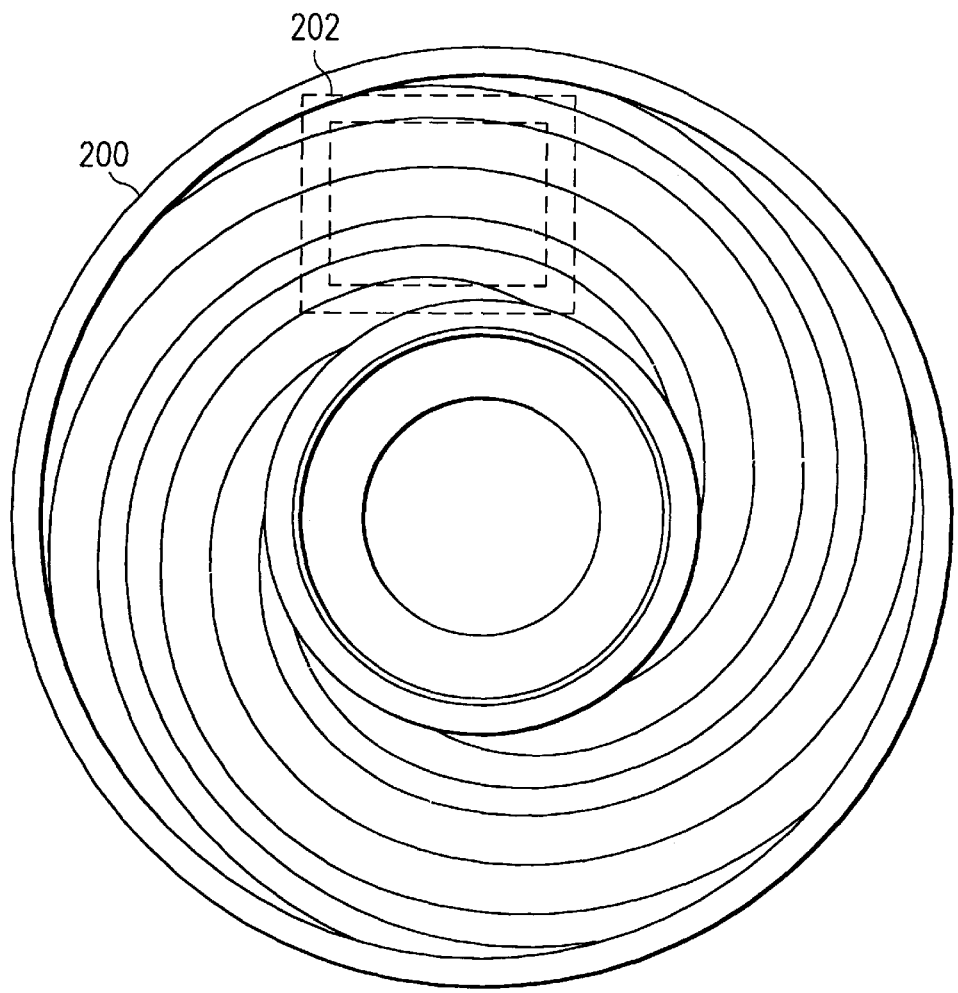
FIG. 2 is a plan view of a spiral color wheel according to one embodiment of the disclosed invention.

FIG. 2 is a plan view of one embodiment of multi-segment spiral color wheel. The color wheel 200 of FIG. 2 has two sets of four color filters. Each set includes one of each of the primary colors, and a clear or white segment that allows all visible light to pass through it. Each primary colored segment transmits one of the primary colors and rejects the other two primary colors. The color wheel of FIG. 2 is 35 mm in diameter and has 2 sets of primary filters, typically red, green, and blue, plus two clear segments, for a total of 10 filter segments.

FIG. 2 shows the outline of the light beam 202 that passes through the color wheel. The outline of the light beam 202 is determined by the shape and location of the integrating rod. The integrator rod is typically positioned very close to the color wheel to ensure that light reflected by the color wheel is recaptured by the integrating rod. Light from the color wheel is imaged onto the spatial light modulator such that a separate portion of the spatial light modulator is illuminated by each filter.

The spiral color wheel of FIG. 2 is used to reduce the size of the color wheel while maintaining good alignment between the modulator and the illuminated segments of the color wheel. The spiral color wheel shown in FIG. 2 has color filters whose boundaries form the "spiral of Archimedes." The spiral of Archimedes is defined by:

$$r = a\theta$$

where r is the radius or distance of said interface from said center, a is a constant, and $\theta$ defines an arc between said interface and a reference. A different reference is used for each boundary between two filters.

Figure 3:
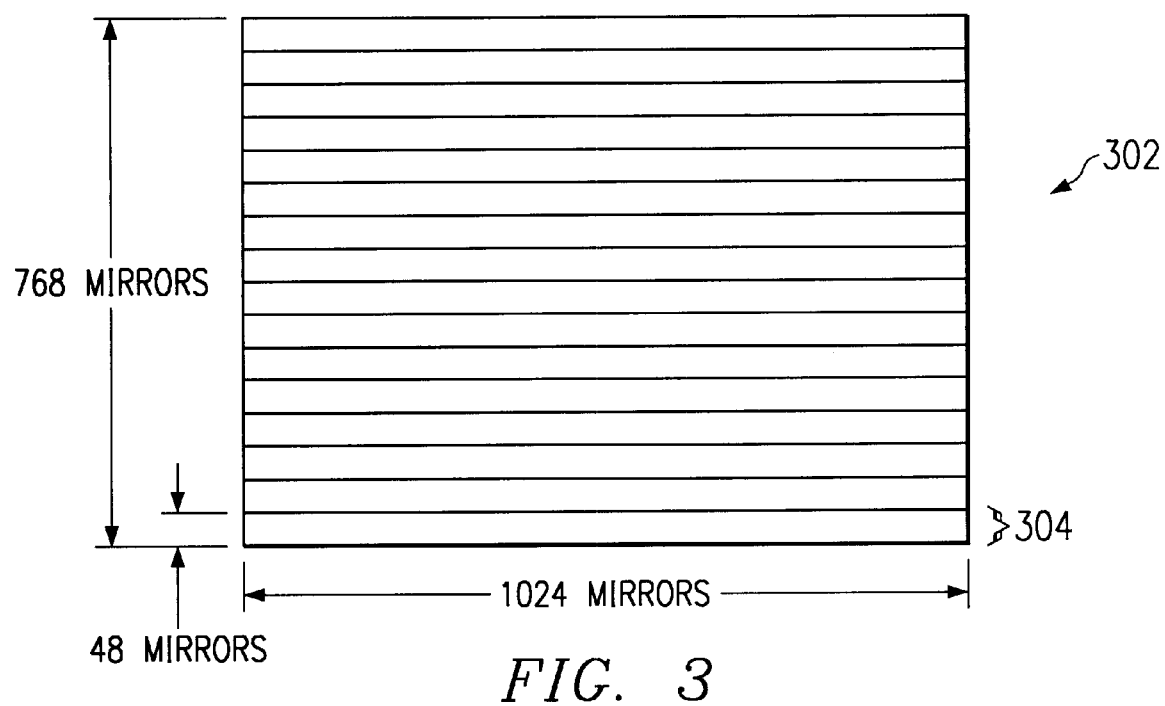
FIG. 3 is a plan view of a micromirror array showing the arrangement of the micromirrors into groups of rows.

A typical micromirror device 302 is shown in FIG. 3. The micromirror shown contains 768 rows of mirrors, with 1024 mirrors in each row. The typical micromirror device has sixteen reset groups 304 of mirrors. Each mirror in the reset group is electrically connected and receives the same mirror bias signal. The mirror bias signal determines when the mirror assumes the position dictated by the memory cell underlying the mirror, and when the mirror is reset to a neutral position. The micromirror reset groups 304 typically are adjacent rows of mirrors. For example, a 1024×768 micromirror array includes 16 groups of 48 rows, each row has 1024 mirrors. Each reset group then consists of 49,152 mirrors.

Since the modulator is typically arranged in horizontal rows of modulator cells that receive many of the same operating signals and bias voltages, the operation of the modulator is more efficient when the primary color segments have horizontal boundaries and move vertically from row to row. The modulator elements can also be arranged in vertical groups of columns, in which case the primary color segments should have vertical boundaries and move horizontally from column to column.

Figure 4:
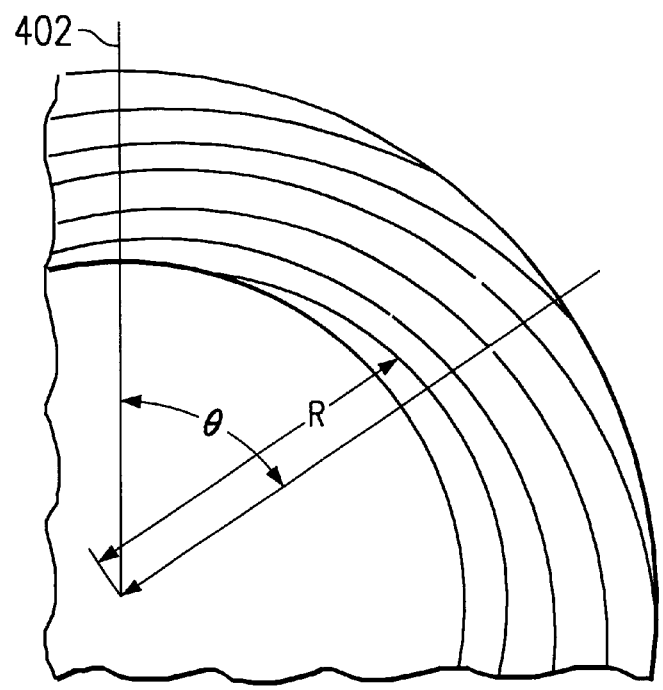
FIG. 4 is a plan view of a portion of a spiral color wheel detailing the curvature of the filter segments.

FIG. 4 shows the relationship between the reference 402, $\theta$, and the radius r. The result of using the spiral of Archimedes is that each boundary approximates an inclined plane sliding past the light valve. The boundary is not straight, so it cannot be parallel to the rows of modulator elements. The boundary does, however, form curve that is tangential to the rows of the modulator elements and the boundary maintains the same curve and speed across the entire face of the modulator, even when using a small filter wheel.

The spirals are designed and aligned to the spatial light modulator such that the tangent of the boundaries between adjacent segments is approximately horizontal to the rows of spatial light modulator. As the spiral wheel turns, the portion of the spiral passing through the beam of light shifts along the spiral maintaining good alignment between the segments and the modulator.

Figure 5:
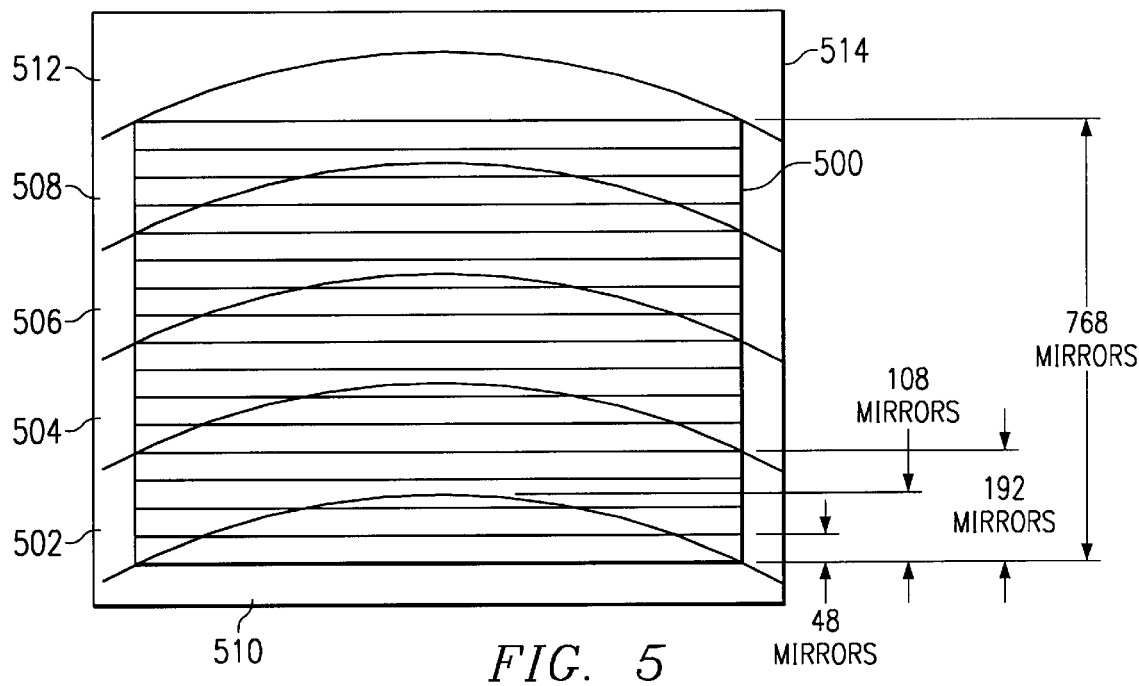
FIG. 5 is a plan view of a spatial light modulator showing the alignment of the filtered light beam on the face of the spatial light modulator.

As the color wheel turns, the three primary color segments imaged onto the spatial light modulator move across the face of the spatial light modulator. FIG. 5 shows the image of a red 502, blue 504, green 506, and two clear 508, 510 segments moving across the face of a spatial light modulator 500. As the second clear segment 508 moves onto the spatial light modulator 500 from the top, the first clear segment 510 moves off the modulator to the bottom. A second red segment 512 is moving toward the modulator, but has not reached it in FIG. 5.

Since each color appears on a different region of the modulator at any given time, the image data provided to the modulator is a mixture of data for all three primary colors and the white segment. For example, while one region of the modulator is operated using red data, other regions of the modulator are operated using green and blue data. During periods in which a boundary between two regions sweeps across a row, image data representing the white content of the image is driven to the mirrors in the row. The net effect of driving the row with white data during every transition of the color wheel is the primary colors are summed to create white and the potential brightness of the display is raised.

As shown in FIG. 5, each boundary between two adjacent color filters may be imaged over 108 rows of modulator elements. Therefore, at any time 432 of the 768 modulator rows are illuminated by light of two colors and are driven with the white data. The lack of time during which the rows can be driven with pure primary colored light reduces the color saturation achievable by the display system. Smaller color wheels, which enable smaller projectors and are therefore more desirable, increase the curvature of the boundaries between the filter segments and further reduce the saturation of the projected images.

Figure 6:
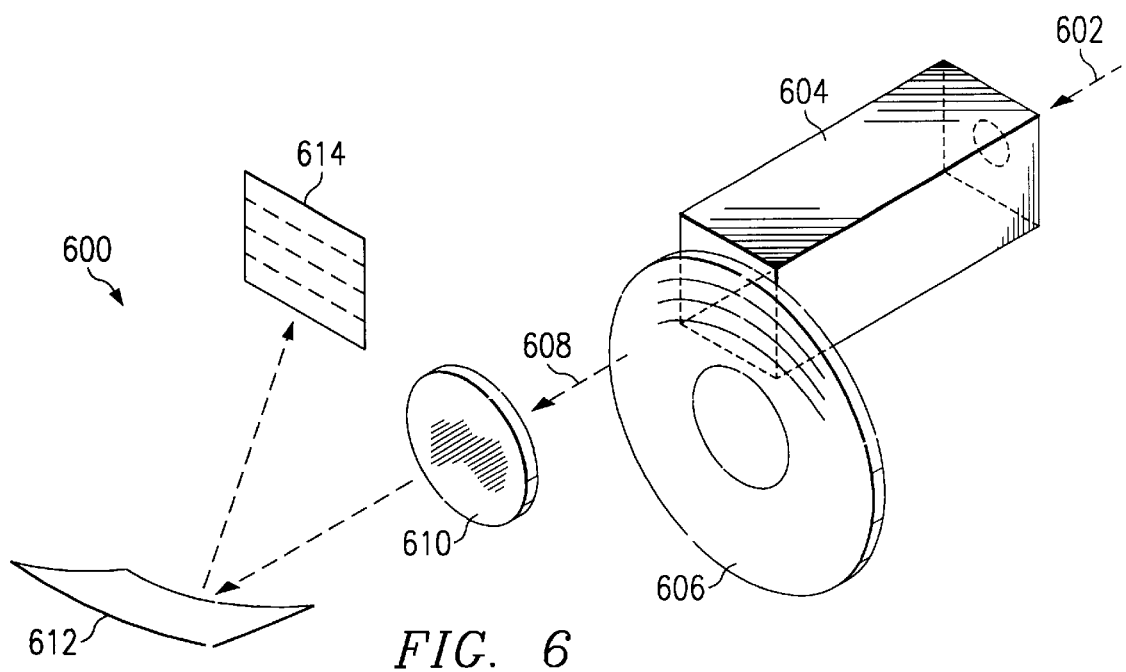
FIG. 6 is a perspective view of one embodiment of the present invention using distortion optics to efficiently couple a spiral color wheel and an orthogonal modulator with the modulator elements organized in groups of rows.

A solution to this problem is to introduce distortion to the image of the color filter projected onto the micromirror device. FIG. 6 is a simplified perspective view of one embodiment of the present invention using distortion optics to efficiently couple a spiral color wheel and an orthogonal modulator. In FIG. 6, light 602 from a light source enters an aperture in a reflective end of a recycling integrator rod 604. The light travels through the rod, reflecting on the surfaces of the rod—whether by internal reflection in a solid rod or by mirrored surfaces on a hollow or solid rod—and exits the end of the rod adjacent a sequential color filter 606, in this case a spiral color wheel.

The shape of the light beam 608 exiting the integrator rod 604 is determined by the shape of the exit aperture of the integrating rod 606. The exit aperture of the integrating rod 606 of prior art systems typically is the entire exit face of a rectangular integrating rod 606 with an aspect ratio equal to the aspect ratio of the spatial light modulator. For reasons that will be come obvious, the present invention typically changes the aspect ratio of the rod and optionally includes a reflective exit aperture on the exit face.

A cross section of the light beam 608 exiting the sequential color filter is shown as rectangle 514 of FIG. 5. The rectangle shape of the light beam includes several bands of filtered light, one for each of the filter segments of the color wheel illuminated by the light beam. As described above, the curvature of the color bands makes it difficult for a row addressed spatial light modulator to efficiently use the light. The new illumination system eliminates or mitigates this problem by distorting the light from the integrating rod to straighten the curved borders between the adjacent filter segments.

In FIG. 6, the light 608 from the sequential color filter 606 is distorted by distortion optics 610, 612 to make the boundaries between the white or primary colored light segments align with the rows of the spatial light modulator 614. In general, any type of distortion optic may be used including, for purposes of illustration and not for purposes of limitation, single and multiple component spherical or aspherical lenses, and spherical or aspherical mirrors. Mirrors may provide the advantage of not introducing chromatic aberrations. Typically, the distortion optics are mounted off-axis to assist in distorting the shapes of the color filters. In FIG. 6, the distortion optics include both a lens system 610 and a curved mirror 612.

Figure 7:
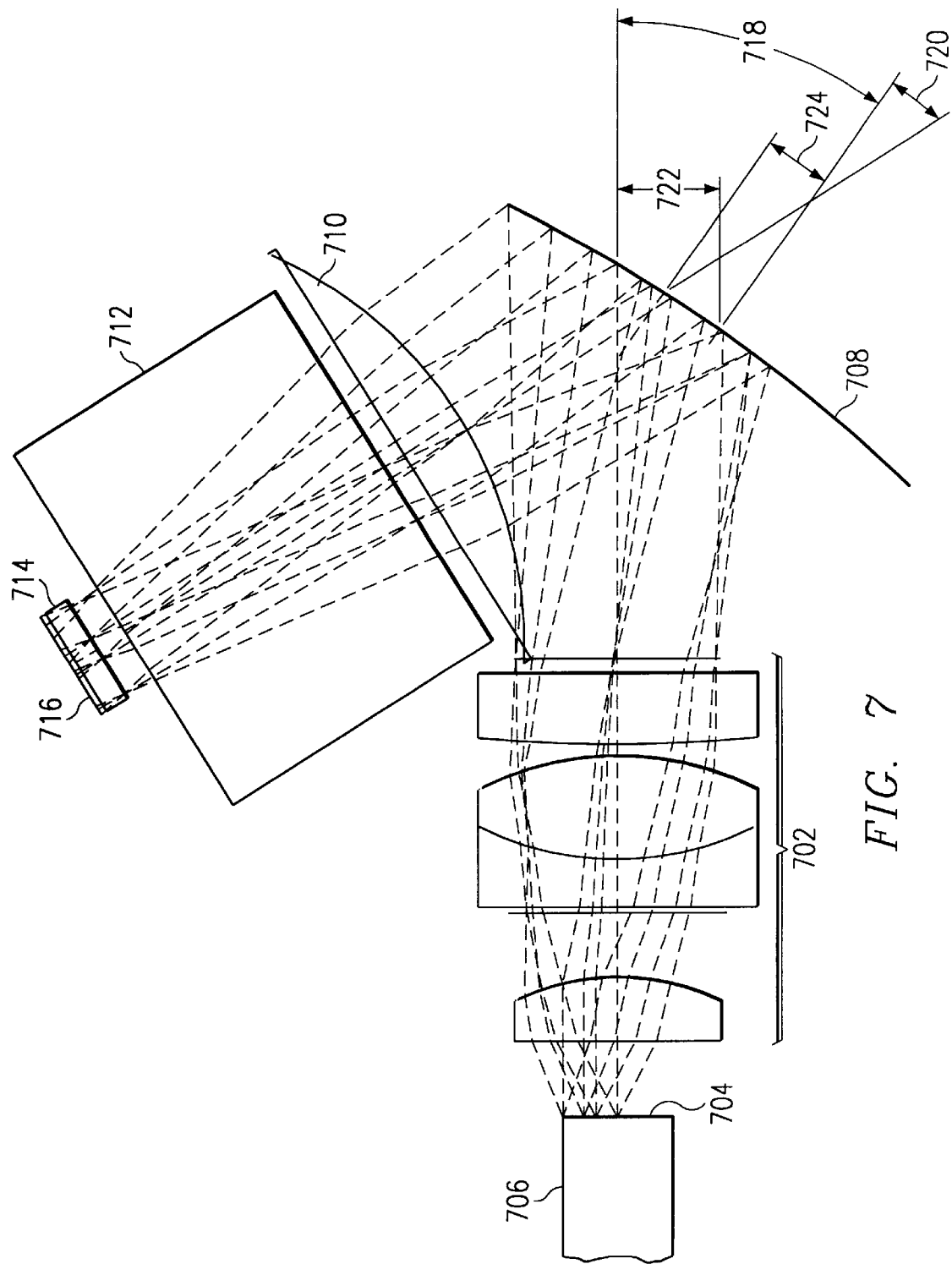
FIG. 7 is a plan view of one embodiment of an illumination optical system for the display system of FIG. 6.

FIG. 7 is a plan view of one embodiment of an illumination optical system for the display system of FIG. 6. In FIG. 7, a condenser lens group 702 gathers and collimates the light leaving the exit face 704 of an integrating rod 706. The light leaving the collimating group is reflected by a conic mirror 708. The conic mirror 708 reflects the light to a collecting lens 710 that passes the light to a TIR prism assembly 712. After passing through the TIR prism assembly 712, the light passes through the micromirror package window 714 before reaching the micromirror 716.

The conic mirror 708 is positioned at an angle 718 to the axis of the condenser optics 702 and an angle 720 to the axis of the collecting lens 710. Additionally, the center of the aspherical mirror 708 is offset 722 from the intersection of the axis of the condenser optics 702 and offset 724 from the intersection of the axis of the collecting lens 710.

Depending on the distortion required, the mirror could be spherical, conical, or aspherical. For the embodiment shown in FIG. 7, the conic mirror is described by:

$$z = \frac{cr^2}{1 + \sqrt{1 - (1+k)c^2r^2}}$$

where: c is the curvature, r is the radial coordinate in lens units, and k is the conic constant. As shown in Table 1, the curvature of the mirror 708 is −200. The conic constant of the mirror 708 is 10. The conic constant is less than −1 for hyperbolas, −1 for parabolas, between −1 and 0 for ellipses, 0 for spheres, and greater than 0 for oblate ellipsoids.

For the embodiment of FIG. 7, the offset 722 from the axis of the condenser optics 702 is 14.704516 mm. The angle between the mirror 708 and the axis of the condenser optics 702 is 35 degrees. The offset 724 from the axis of the collecting lens 710 is 0.7545004 mm. The angle between the mirror 708 and the axis of the collecting lens 710 is 23 degrees. Other embodiments use different mirrors or lenses in place of the aspherical mirror 708. Table 1 is a complete listing of the optical system shown in FIG. 7.

Figure 8:
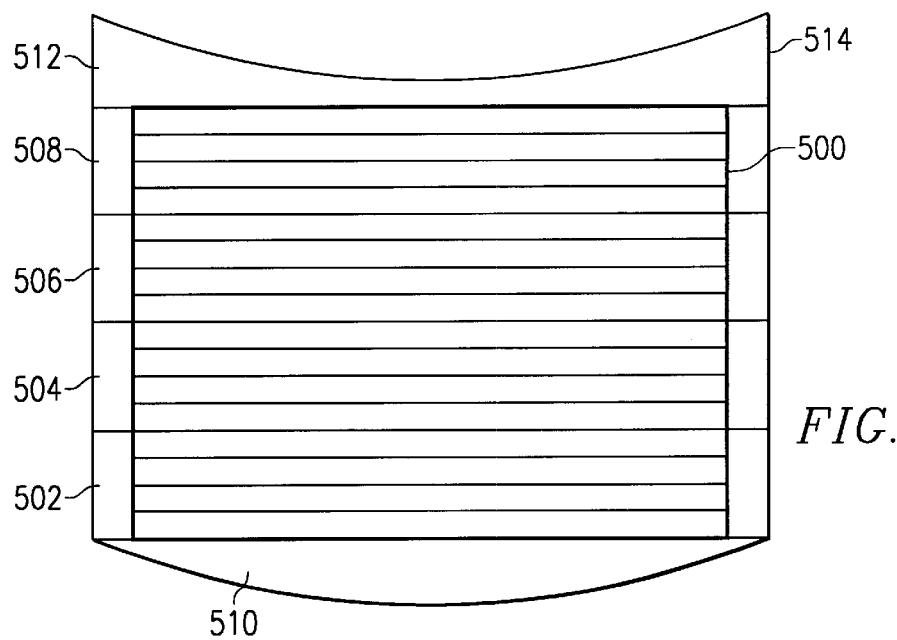
FIG. 8 is a plan view of the surface of the spatial light modulator of FIG. 5 illuminated by a light beam after the light beam has been distorted by the distortion optics of FIG. 6.

FIG. 8 is a plan view of the surface of the spatial light modulator 500 illuminated by the light beam 514 after the light beam has been distorted by the distortion optics of FIG. 6. In FIG. 8, the boundaries between the filter segments have been straightened by the distortion optics to align with the rows of the spatial light modulator 500. The distortion optics need not perfectly align the boundaries between the various colors with the modulator rows, but the better the alignment the better the efficiency.

As shown in FIGS. 5 and 8, the curved filter segments require a rectangular light beam to be much larger than the rectangular modulator on which its distorted image will be focused. This reduces the intensity of the light actually focused onto the modulator. A scrolling color recycling system can recover this excess light by using a reflective aperture that masks the exit end of the integrating rod except for the portion of the rod that actually is imaged onto the modulator.

Figure 9:
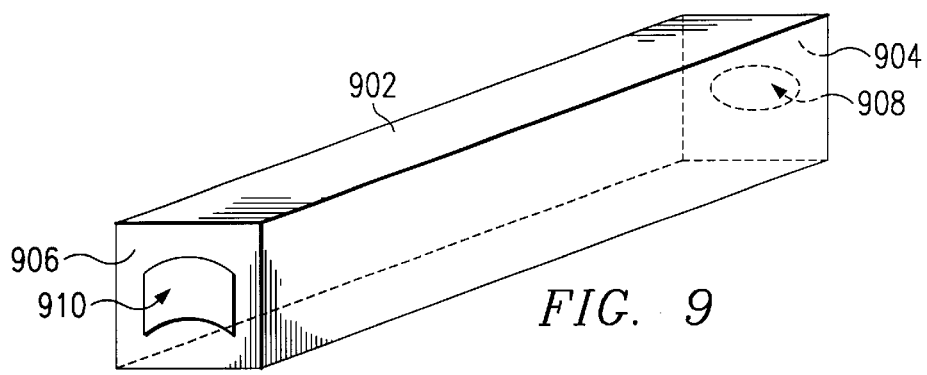
FIG. 9 is a perspective view of an integrating rod that includes a mirrored entrance face and an optional exit face aperture.

FIG. 9 is a perspective view of an integrating rod 902 that includes a mirrored entrance face 904 and an optional exit face 906 aperture 910. The exit face 906 typically is mirrored. The importance of the mirrored aperture on the exit face 906 increases as the curve of the spiral color filters increases. The open entrance aperture 908 on the entrance face 904 is shaped and sized to efficiently couple the light from a light source into the integrating rod 902. An open exit aperture 910 on the exit face 906 of the integrating rod 902 is shaped and sized to be imaged onto the face of the spatial light modulator without excess overfill.

In FIG. 9, light traveling through the integrator rod 902 that strikes the mirrored portion of the exit face is reflected back through the integrating rod 902 to the entrance face 904. If the returning light strikes the mirrored portion of the entrance face 904 it reflects back through the integrating rod 902 and has another opportunity to pass through the exit aperture 910. Light continues to reflect inside the integrating rod 902 until it passes through either of the apertures or is absorbed.

Figure 10:
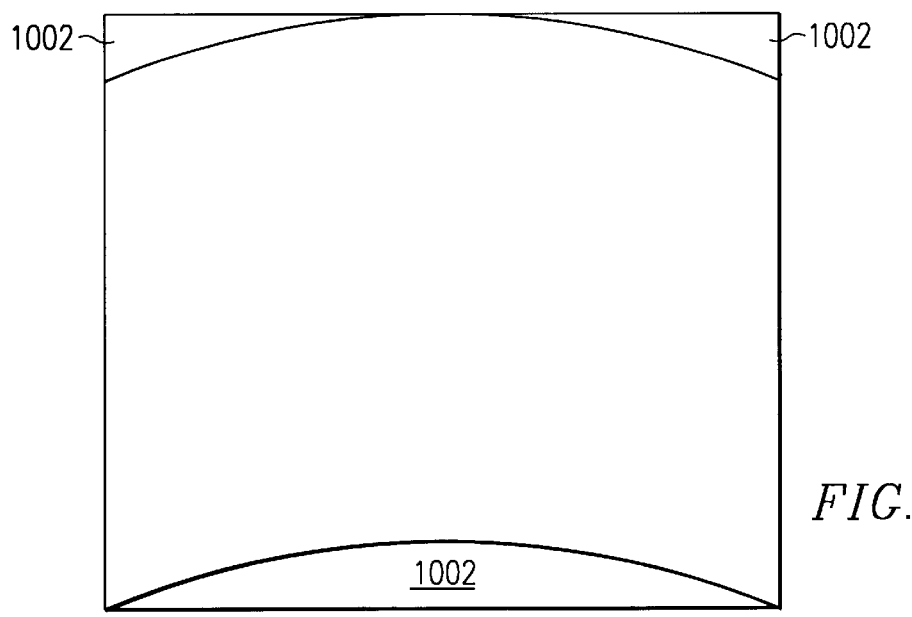
FIG. 10 is a plan view of the exit aperture of the integrating rod of FIG. 9 according to one embodiment of the present invention.

FIG. 10 is a plan view of the exit aperture of the integrating rod according to one embodiment of the present invention. In FIG. 10, the aperture extends to all four sides of the integrating rod. Three mirrored areas 1002 define a clear aperture with two curved sides that match the curve of the filter segments as they pass by each side of the integrating rod. The size of the open aperture allows light from the integrating rod to illuminate one full segment of each segment color on the color wheel.

Thus, although there has been disclosed to this point a particular embodiment for an efficient illumination system for a scrolling color recycling projection system and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. §112, paragraph six.

TABLE 1

LENS DATA

GENERAL LENS DATA:

| | |
|---|---|
| Surfaces | 23 |
| Stop | 1 |
| System Aperture | Object Space NA = 0.47 |
| Glass Catalogs | OHARA minolta |
| Ray Aiming | Real Reference, Cache On |
| X Pupil shift | 0 |
| Y Pupil shift | 0 |
| Z Pupil shift | 0 |
| Apodization | Gaussian, factor = 6.00000E−001 |
| Effective Focal Length | −76.47616 (in air) |
| Effective Focal Length | −76.47616 (in image space) |
| Back Focal Length | 146.8078 |
| Total Track | 3120.381 |
| Image Space F/# | 0.02393721 |
| Paraxial Working F/# | 1.748671 |
| Working F/# | 1.874482 |
| Image Space NA | 0.2749141 |
| Object Space NA | 0.47 |
| Stop Radius | −1597.432 |
| Paraxial Image Height | 11.91844 |
| Paraxial Magnification | −1.862256 |
| Entrance Pupil Diameter | −3194.865 |
| Entrance Pupil Position | 0 |
| Exit Pupil Diameter | 82.574 |
| Exit Pupil Position | −148.2844 |
| Field Type | Object height in Millimeters |
| Maximum Field | 6.4 |
| Primary Wave | 0.55 |
| Lens Units | Millimeters |
| Angular Magnification | −38.69093 |

Fields: 4
Field Type: Object height in Millimeters

| # | X-Value | Y-Value | Weight |
|---|---|---|---|
| 1 | 0.000000 | 0.000000 | 1.000000 |
| 2 | 0.000000 | 2.500000 | 1.000000 |
| 3 | 0.000000 | 4.000000 | 1.000000 |
| 4 | 0.000000 | 6.400000 | 1.000000 |

Vignetting Factors

| # | VDX | VDY | VCX | VCY |
|---|---|---|---|---|
| 1 | 0.000000 | 0.000000 | 0.000000 | 0.000000 |
| 2 | 0.000000 | 0.000000 | 0.000000 | 0.000000 |
| 3 | 0.000000 | 0.000000 | 0.000000 | 0.200000 |
| 4 | 0.000000 | 0.000000 | 0.100000 | 0.300000 |

Wavelengths: 5
Units: Microns

| # | Value | Weight |
|---|---|---|
| 1 | 0.450000 | 1.000000 |
| 2 | 0.490000 | 1.000000 |
| 3 | 0.550000 | 1.000000 |
| 4 | 0.610000 | 1.000000 |
| 5 | 0.650000 | 1.000000 |

SURFACE DATA SUMMARY:

| Surf | Type | Radius | Thickness |
|---|---|---|---|
| OBJ | STANDARD | Infinity | −3000 |
| STO | STANDARD | Infinity | 3000 |
| 2 | STANDARD | Infinity | 9 |
| 3 | STANDARD | −383.7957 | 7 |
| 4 | STANDARD | −29.16254 | 8 |
| 5 | STANDARD | Infinity | 0.467447 |
| 6 | STANDARD | −1641.567 | 6 |
| 7 | STANDARD | 42.75783 | 12 |
| 8 | STANDARD | −31.89381 | 1 |
| 9 | STANDARD | 200 | 8 |
| 10 | STANDARD | 1233.289 | 1.913955 |
| 11 | STANDARD | Infinity | 47 |
| 12 | COORDBRK | — | 0 |
| 13 | COORDBRK | — | 0 |
| 14 | STANDARD | −200 | 20 |
| 15 | COORDBRK | — | 0 |
| 16 | COORDBRK | — | −50 |
| 17 | STANDARD | −46.57814 | −8 |
| 18 | STANDARD | Infinity | −2 |
| 19 | STANDARD | Infinity | −36.3 |
| 20 | STANDARD | Infinity | −4 |
| 21 | STANDARD | Infinity | −3.08 |
| 22 | STANDARD | Infinity | −0.5 |
| IMA | STANDARD | Infinity | |

| Surf | Glass | Diameter | Conic |
|---|---|---|---|
| OBJ | | 12.8 | 0 |
| STO | | 3194.865 | 0 |
| 2 | | 12.8 | 0 |
| 3 | S-LAH79 | 24 | 0 |
| 4 | | 24 | 0 |
| 5 | | 21.39037 | 0 |
| 6 | SF59 | 32 | 0 |
| 7 | S-LAL10 | 32 | 0 |
| 8 | | 32 | 0 |
| 9 | S-LAH52 | 32 | 0 |
| 10 | | 32 | 0 |
| 11 | | 23.93795 | 0 |
| 12 | | — | — |
| 13 | | — | — |
| 14 | MIRROR | 58.03327 | 10 |
| 15 | | — | — |
| 16 | | — | — |
| 17 | LAK9 | 56 | 0 |
| 18 | | 56 | 0 |
| 19 | BK7 | 48 | 0 |
| 20 | | 48 | 0 |
| 21 | ZKN7 | 12.26971 | 0 |
| 22 | | 13.15502 | 0 |
| IMA | | 13.37684 | 0 |

SURFACE DATA DETAIL:

| | |
|---|---|
| Surface OBJ | STANDARD |
| Scattering | None |
| Surface STO | STANDARD |
| Scattering | None |
| Surface 2 | STANDARD |
| Scattering | None |
| Surface 3 | STANDARD |
| Aperture | Floating Aperture |
| Maximum Radius | 12 |
| Scattering | None |
| Surface 4 | STANDARD |
| Aperture | Floating Aperture |
| Maximun Radius | 12 |
| Scattering | None |
| Surface 5 | STANDARD |
| Aperture | Circular Aperture |
| Minimum Radius | 0 |
| Maximum Radius | 12.7 |
| Scattering | None |
| Surface 6 | STANDARD |
| Aperture | Floating Aperture |
| Maximum Radius | 16 |
| Scattering | None |
| Surface 7 | STANDARD |
| Aperture | Floating Aperture |
| Maximum Radius | 16 |
| Scattering | None |
| Surface 8 | STANDARD |
| Aperture | Floating Aperture |
| Maximum Radius | 16 |
| Scattering | None |

TABLE 1-continued

LENS DATA

| Surface 9 | STANDARD |
| --- | --- |
| Aperture | Floating Aperture |
| Maximum Radius | 16 |
| Scattering | None |
| Surface 10 | STANDARD |
| Aperture | Floating Aperture |
| Maximum Radius | 16 |
| Scattering | None |
| Surface 11 | STANDARD |
| Scattering | None |
| Surface 12 | COORDBRK |
| Decenter X | 0 |
| Decenter Y | 0 |
| Tilt About X | 35 |
| Tilt About Y | 0 |
| Tilt About Z | 0 |
| Order | Decenter then tilt |
| Scattering | None |
| Surface 13 | COORDBRK |
| Decenter X | 0 |
| Decenter Y | −14.704516 |
| Tilt About X | 0 |
| Tilt About Y | 0 |
| Tilt About Z | 0 |
| Order | Decenter then tilt |
| Scattering | None |
| Surface 14 | STANDARD |
| Scattering | None |
| Surface 15 | COORDBRK |
| Decenter X | 0 |
| Decenter Y | −0.7545004 |
| Tilt About X | 0 |
| Tilt About Y | 0 |
| Tilt About Z | 0 |
| Order | Decenter then tilt |
| Scattering | None |
| Surface 16 | COORDBRK |
| Decenter X | 0 |
| Decenter Y | 0 |
| Tilt About X | 23 |
| Tilt About Y | 0 |
| Tilt About Z | 0 |
| Order | Decenter then tilt |
| Scattering | None |
| Surface 17 | STANDARD |
| Aperture | Circular Aperture |
| Minimum Radius | 0 |
| Maximum Radius | 28 |
| Scattering | None |
| Surface 18 | STANDARD |
| Aperture | Floating Aperture |
| Maximum Radius | 28 |
| Scattering | None |
| Surface 19 | STANDARD |
| Aperture | Floating Aperture |
| Maximum Radius | 24 |
| Scattering | None |
| Surface 20 | STANDARD |
| Aperture | Floating Aperture |
| Maximum Radius | 24 |
| Scattering | None |
| Surface 21 | STANDARD |
| Scattering | None |
| Surface 22 | STANDARD |
| Scattering | None |
| Surface IMA | STANDARD |
| Scattering | None |

TABLE 1-continued

LENS DATA

COATING DEFINITIONS:
GLOBAL VERTEX COORDINATES, ORIENTATIONS,
AND ROTATION/OFFSET MATRICES:
Reference Surface: 2

| Surf | R11 R21 R31 | R12 R22 R32 | R13 R23 R33 | X Y Z |
| --- | --- | --- | --- | --- |
| 0 | 1.000000 0.000000 0.000000 | 0.000000 1.000000 0.000000 | 0.000000 0.000000 1.000000 | 0.000000 0.000000 0.000000 |
| 1 | 1.000000 0.000000 0.000000 | 0.000000 1.000000 0.000000 | 0.000000 0.000000 1.000000 | 0.000000 0.000000 −3000.000000 |
| 2 | 1.000000 0.000000 0.000000 | 0.000000 1.000000 0.000000 | 0.000000 0.000000 1.000000 | 0.000000 0.000000 0.000000 |
| 3 | 1.000000 0.000000 0.000000 | 0.000000 1.000000 0.000000 | 0.000000 0.000000 1.000000 | 0.000000 0.000000 9.000000 |
| 4 | 1.000000 0.000000 0.000000 | 0.000000 1.000000 0.000000 | 0.000000 0.000000 1.000000 | 0.000000 0.000000 16.000000 |
| 5 | 1.000000 0.000000 0.000000 | 0.000000 1.000000 0.000000 | 0.000000 0.000000 1.000000 | 0.000000 0.000000 24.000000 |
| 6 | 1.000000 0.000000 0.000000 | 0.000000 1.000000 0.000000 | 0.000000 0.000000 1.000000 | 0.000000 0.000000 24.467447 |
| 7 | 1.000000 0.000000 0.000000 | 0.000000 1.000000 0.000000 | 0.000000 0.000000 1.000000 | 0.000000 0.000000 30.467447 |
| 8 | 1.000000 0.000000 0.000000 | 0.000000 1.000000 0.000000 | 0.000000 0.000000 1.000000 | 0.000000 0.000000 42.467447 |
| 9 | 1.000000 0.000000 0.000000 | 0.000000 1.000000 0.000000 | 0.000000 0.000000 1.000000 | 0.000000 0.000000 43.467447 |
| 10 | 1.000000 0.000000 0.000000 | 0.000000 1.000000 0.000000 | 0.000000 0.000000 1.000000 | 0.000000 0.000000 51.467447 |
| 11 | 1.000000 0.000000 0.000000 | 0.000000 1.000000 0.000000 | 0.000000 0.000000 1.000000 | 0.000000 0.000000 53.381402 |
| 12 | 1.000000 0.000000 0.000000 | 0.000000 0.819152 0.573576 | 0.000000 −0.573576 0.819152 | 0.000000 0.000000 100.381402 |
| 13 | 1.000000 0.000000 0.000000 | 0.000000 0.819152 0.573576 | 0.000000 −0.573576 0.819152 | 0.000000 −12.045234 91.947238 |
| 14 | 1.000000 0.000000 0.000000 | 0.000000 0.819152 0.573576 | 0.000000 −0.573576 0.819152 | 0.000000 −12.045234 91.947238 |
| 15 | 1.000000 0.000000 0.000000 | 0.000000 0.819152 0.573576 | 0.000000 −0.573576 0.819152 | 0.000000 −24.134814 107.897515 |
| 16 | 1.000000 0.000000 0.000000 | 0.000000 0.529919 0.848048 | 0.000000 −0.848048 0.529919 | 0.000000 −24.134814 107.897515 |
| 17 | 1.000000 0.000000 0.000000 | 0.000000 0.529919 0.848048 | 0.000000 −0.848048 0.529919 | 0.000000 18.267591 81.401552 |
| 18 | 1.000000 0.000000 0.000000 | 0.000000 0.529919 0.848048 | 0.000000 −0.848048 0.529919 | 0.000000 25.051976 77.162198 |
| 19 | 1.000000 0.000000 0.000000 | 0.000000 0.529919 0.848048 | 0.000000 −0.848048 0.529919 | 0.000000 26.748072 76.102360 |
| 20 | 1.000000 0.000000 0.000000 | 0.000000 0.529919 0.848048 | 0.000000 −0.848048 0.529919 | 0.000000 57.532218 56.866290 |
| 21 | 1.000000 0.000000 0.000000 | 0.000000 0.529919 0.848048 | 0.000000 −0.848048 0.529919 | 0.000000 60.924410 54.746613 |

TABLE 1-continued

LENS DATA

| 22 | 1.000000 | 0.000000 | 0.000000 | 0.000000 |
|----|----------|----------|----------|----------|
|    | 0.000000 | 0.529919 | −0.848048 | 63.536399 |
|    | 0.000000 | 0.848048 | 0.529919 | 53.114462 |
| 23 | 1.000000 | 0.000000 | 0.000000 | 0.000000 |
|    | 0.000000 | 0.529919 | −0.848048 | 63.960423 |
|    | 0.000000 | 0.848048 | 0.529919 | 52.849502 |

What is claimed is:

1. A display system comprising:
   a light source for producing a beam of white light along a path;
   a sequential color filter receiving said beam of white light to form a filtered beam of light having a first cross section;
   a spatial light modulator having a second cross section;
   distortion optics on an optical path between said sequential color filter and said spatial light modulator, said distortion optics operable to receive and distort said filtered beam to a filtered beam having a cross section more efficiently coupled to said spatial light modulator than said first cross section; and
   a controller electrically connected to said spatial light modulator for providing image data to said spatial light modulator, said spatial light modulator operable to modulate said filtered beam according to said image data.

2. The display system of claim 1, comprising:
   a recycling integrator on said path of said white light beam.

3. The display system of claim 1, comprising:
   a recycling integrator on said path of said white light beam, said recycling integrator having an exit aperture defining said first cross section.

4. The display system of claim 1, comprising:
   a recycling integrator on said path of said white light beam, said recycling integrator having a reflective exit face with an aperture defining said first cross section.

5. The display system of claim 1, said sequential color filter comprising:
   a spiral color wheel.

6. The display system of claim 1, comprising:
   a recycling integrator on said path of said white light beam, said recycling integrator having an exit aperture defining said first cross section; and
   said sequential color filter comprising a spiral color wheel, said first cross section having at least one curved side following a boundary between two segments on said spiral color wheel.

7. The display system of claim 6, said exit aperture having at least two opposite sides shaped to follow said boundary between two segments on said spiral color wheel, said exit aperture sized to allow said white light beam to illuminate at least three color filters.

8. The display system of claim 6, said exit aperture having at least two opposite sides shaped to follow said boundary between two segments on said spiral color wheel, said exit aperture sized to allow said white light beam to illuminate at least three color filters across their entire width.

9. The display system of claim 6, said exit aperture having at least two opposite sides shaped to follow said boundary between two segments on said spiral color wheel, said exit aperture sized to allow said white light beam to illuminate at least three primary color filters and at least one clear filter.

10. The display system of claim 6, said exit aperture having at least two opposite sides shaped to follow said boundary between two segments on said spiral color wheel, said exit aperture sized to allow said white light beam to illuminate at least three primary color filters across their entire width and at least one clear filter across its width.

11. The display system of claim 1, said distortion optics comprising:
    a spherical mirror.

12. The display system of claim 1, said distortion optics comprising:
    an aspherical mirror.

13. The display system of claim 1, said distortion optics comprising:
    a spherical lens.

14. The display system of claim 1, said distortion optics comprising:
    an aspherical lens.

15. The display system of claim 1, said distortion optics comprising:
    a mirror and lens.

16. The display system of claim 1, said distortion optics distorting a curved image of a boundary between two adjacent filter segments to align with rows of said spatial light modulator such that said distorted image of said boundary is imaged across less of said rows than said undistorted boundary image.

17. A method of illuminating a spatial light modulator, the method comprising:
    producing a beam of white light along a path;
    sequentially color filtering said beam of white light to form a filtered beam of light having a first cross section;
    distorting said filtered beam of light to have a second cross section; and
    spatially modulating said distorted beam of light using a spatial light modulator, said distorting operable to improve the alignment of filter boundaries to groups of spatial light modular elements.

18. The method of claim 17, comprising:
    recycling light rejected by said sequentially color filtering.

19. The method of claim 17, comprising:
    recycling light rejected by said sequentially color filtering using a recycling integrator on said path of said white light beam, said recycling integrator having an exit aperture defining said first cross section.

20. The method of claim 17, comprising:
    recycling light rejected by said sequentially color filtering using a recycling integrator on said path of said white light beam, said recycling integrator having a reflective exit aperture defining said first cross section.

21. The method of claim 17, said sequentially color filtering comprising:
    sequentially color filtering said beam of white light to using a spiral color wheel to form a filtered beam of light having a first cross section.

22. The method of claim 17, comprising:
    recycling light rejected by said sequentially color filtering using a recycling integrator on said path of said white light beam, said recycling integrator having an exit aperture defining said first cross section; and said sequentially color filtering comprising sequentially color filtering said beam of white light to using a spiral color wheel, said first cross section having at least one curved side following a boundary between two segments on said spiral color wheel.

23. The method of claim 22, said recycling light comprising:

recycling light rejected by said sequentially color filtering using a recycling integrator having an exit aperture with at least two opposite sides shaped to follow said boundary between two segments on said spiral color wheel, said exit aperture sized to allow said white light beam to illuminate at least three color filters.

24. The method of claim 22, said recycling light comprising:

recycling light rejected by said sequentially color filtering using a recycling integrator having an exit aperture with at least two opposite sides shaped to follow said boundary between two segments on said spiral color wheel, said exit aperture sized to allow said white light beam to illuminate at least three color filters across their entire width.

25. The method of claim 22, said recycling light comprising:

recycling light rejected by said sequentially color filtering using a recycling integrator having an exit aperture with at least two opposite sides shaped to follow said boundary between two segments on said spiral color wheel, said exit aperture sized to allow said white light beam to illuminate at least three primary color filters and at least one clear filter.

26. The method of claim 22, said recycling light comprising:

recycling light rejected by said sequentially color filtering using a recycling integrator having an exit aperture with at least two opposite sides shaped to follow said boundary between two segments on said spiral color wheel, said exit aperture sized to allow said white light beam to illuminate at least three primary color filters across their entire width and at least one clear filter across its width.

27. The method of claim 17, said distorting comprising:

distorting said filtered beam of light to have a second cross section using a spherical mirror.

28. The method of claim 17, said distorting comprising:

distorting said filtered beam of light to have a second cross section using an aspherical mirror.

29. The method of claim 17, said distorting comprising:

distorting said filtered beam of light to have a second cross section using a spherical lens.

30. The method of claim 17, said distorting comprising:

distorting said filtered beam of light to have a second cross section using an aspherical lens.

31. The method of claim 17, said distorting comprising:

distorting said filtered beam of light to have a second cross section using a mirror and lens.

32. The method of claim 17, said distorting comprising:

distorting a curved image of a boundary between two adjacent filter segments to align with rows of said spatial light modulator such that said distorted image of said boundary is imaged across less of said rows than said undistorted boundary image.

33. The method of claim 17, comprising:

modulating said distorted beam of light using said spatial light modulator.

34. The method of claim 17, comprising:

modulating said distorted beam of light using said spatial light modulator; and focusing said modulated light onto an image plane.

35. A display system comprising:

a light source for producing a beam of white light along a path;

a recycling integrator on said path of said white light beam, said recycling integrator having an exit aperture defining said first cross section; and a sequential color filter receiving said beam of white light to form a filtered beam of light having a first cross section, said first cross section having at least one curved side following a boundary between two segments on said sequential color filter;

a spatial light modulator having a second cross section;

distortion optics on an optical path between said sequential color filter and said spatial light modulator, said distortion optics operable to receive and distort said filtered beam to a filtered beam having a cross section more efficiently coupled to said spatial light modulator than said first cross section.

36. The display system of claim 35, comprising:

a controller electrically connected to said spatial light modulator for providing image data to said spatial light modulator, said spatial light modulator operable to modulate said filtered beam according to said image data.

37. The display system of claim 35, comprising:

a recycling integrator on said path of said white light beam.

38. The display system of claim 35, comprising:

a recycling integrator on said path of said white light beam, said recycling integrator having an exit aperture defining said first cross section.

39. The display system of claim 35, comprising:

a recycling integrator on said path of said white light beam, said recycling integrator having a reflective exit face with an aperture defining said first cross section.

40. The display system of claim 35, said sequential color filter comprising:

a spiral color wheel.

41. The display system of claim 35, said exit aperture having at least two opposite sides shaped to follow said boundary between two segments on said spiral color wheel, said exit aperture sized to allow said white light beam to illuminate at least three color filters.

42. The display system of claim 35, said exit aperture having at least two opposite sides shaped to follow said boundary between two segments on said spiral color wheel, said exit aperture sized to allow said white light beam to illuminate at least three color filters across their entire width.

43. The display system of claim 35, said exit aperture having at least two opposite sides shaped to follow said boundary between two segments on said spiral color wheel, said exit aperture sized to allow said white light beam to illuminate at least three primary color filters and at least one clear filter.

44. The display system of claim 35, said exit aperture having at least two opposite sides shaped to follow said boundary between two segments on said spiral color wheel, said exit aperture sized to allow said white light beam to illuminate at least three primary color filters across their entire width and at least one clear filter across its width.

45. The display system of claim 35, said distortion optics comprising:

a spherical mirror.

46. The display system of claim 35, said distortion optics comprising:

an aspherical mirror.

47. The display system of claim 35, said distortion optics comprising:

a spherical lens.

48. The display system of claim 35, said distortion optics comprising:

an aspherical lens.

49. The display system of claim 35, said distortion optics comprising:

a mirror and lens.

50. The display system of claim 35, said distortion optics distorting a curved image of a boundary between two adjacent filter segments to align with rows of said spatial light modulator such that said distorted image of said boundary is imaged across less of said rows than said undistorted boundary image.

* * * * *